(12) United States Patent
Sher (10) Patent No.: US 7,872,578 B2
(45) Date of Patent: Jan. 18, 2011

(54) TRACKING, IDENTIFICATION, AND SECURITY SYSTEM FOR A PORTABLE DEVICE

(76) Inventor: Yevgeniy Il'ich Sher, 6216 Shelter Creek La., San Bruno, CA (US) 94066

( * ) Notice: Subject to any disclaimer, the term of this patent is extended or adjusted under 35 U.S.C. 154(b) by 384 days.

(21) Appl. No.: 12/143,036

(22) Filed: Jun. 20, 2008

(65) Prior Publication Data

US 2009/0315714 A1 Dec. 24, 2009

(51) Int. Cl.
*G08B 13/14* (2006.01)
(52) U.S. Cl. .................................................. 340/568.1
(58) Field of Classification Search ............ 340/825.69, 340/568.1, 539.11, 539.23, 572.1; 455/411
See application file for complete search history.

(56) References Cited

U.S. PATENT DOCUMENTS

| | | | |
|---|---|---|---|
| 5,467,082 A | 11/1995 | Sanderson | |
| 5,578,991 A | 11/1996 | Scholder | |
| 5,748,085 A | 5/1998 | Davis et al. | |
| 5,757,271 A * | 5/1998 | Andrews | 340/568.1 |
| 5,821,859 A | 10/1998 | Schrott et al. | |
| 5,939,984 A | 8/1999 | Brady et al. | |
| 5,955,951 A | 9/1999 | Wischerop et al. | |
| 6,011,473 A | 1/2000 | Klein | |
| 6,137,409 A * | 10/2000 | Stephens | 340/568.1 |
| 6,304,169 B1 | 10/2001 | Blama et al. | |
| 6,356,197 B1 | 3/2002 | Patterson et al. | |
| 6,359,444 B1 | 3/2002 | Grimes | |
| 6,362,738 B1 | 3/2002 | Vega | |
| 6,570,610 B1 * | 5/2003 | Kipust | 348/156 |
| 6,617,962 B1 | 9/2003 | Horwitz et al. | |
| 6,696,953 B2 | 2/2004 | Qiu et al. | |
| 6,804,699 B1 | 10/2004 | Henrie | |
| 7,009,512 B2 * | 3/2006 | Cordoba | 340/539.23 |
| 7,183,917 B2 | 2/2007 | Piccoli et al. | |
| 7,190,264 B2 | 3/2007 | Brown et al. | |
| 7,786,861 B2 * | 8/2010 | Howarth et al. | 340/568.1 |

* cited by examiner

*Primary Examiner*—Phung Nguyen
(74) *Attorney, Agent, or Firm*—Workman Nydegger (57) ABSTRACT

A system for providing security for an electronic device comprising an embeddable security device and a remote portable device. In operation, when the embeddable security device and the remote portable device are proximate to each other, the embeddable security component will not trigger an external alarm system. However, when the two devices are not proximate, the embeddable security device is configured to emit a signal that activates the external alarm system.

22 Claims, 8 Drawing Sheets

TRACKING, IDENTIFICATION, AND SECURITY SYSTEM FOR A PORTABLE DEVICE

CROSS-REFERENCE TO RELATED APPLICATIONS

Not Applicable

BACKGROUND

Thousands of portable devices are lost, misplaced and/or stolen, daily. While numerous mechanical devices exist to secure portable devices to fixed and/or relatively difficult-to-move objects these devices generally require that a physical connection be made between the device and securing object. For many portable items, such a physical bond is, at best, undesirable and in some instances impractical.

Radio-Frequency Identification (RFID) tags have existed for many years in various forms. For example, U.S. Pat. No. 3,713,148 describes a basic antenna and passive transponder capable of emitting a signal powered by and in response to an interrogation signal. The device was the first example of the modern toll devices used by many to pay tolls at many bridges and on toll roads. Such devices, even modernly, only carry a limited amount of information, up to a maximum of about 32 bytes and convey only a semi-unique identification number.

Modernly, stores have employed RFID technology in conjunction with door sensors to deter theft of moderate to higher-priced items. The systems operate similarly to the earlier-developed transponder systems, but need only convey limited information and are configured to that they can be easily disabled by merchants by bringing the RFID tag into close proximity with a magnetic source. Proliferation of the basic RFID tagging technology has meant that almost all stores have some form on RFID security system in place at entrances and exits, if only to deter theft. However, these security systems to do not deter theft of items that are not owned by the store that owns/operates the security system.

Recently proliferation of laptop computer and other portable electronic devices, such as MP3 players, video players and the like, has come with a marked rise in theft of these devices. Various systems exist to protect these devices, ranging from serialization and UV marking to hardware and software protection/disabling systems. However, these systems rely upon a user actively making use of them and do not aid in recovery of the items, but merely deter theft by disabling the device or simply marking the device so that if it is recovered it can be returned to its owner.

Automotive recovery systems exists that employ Global Positioning System technology to track the location of a vehicle. The systems can be linked with law enforcement and can be used by law enforcement to recover the vehicle and/or, if linked the appropriate systems within the vehicle, disable the vehicle. However, these systems rely on satellite technology which generally requires line-of-site communication between the vehicle and the relevant satellites and thus are relatively ineffective in covered spaces. Additionally, the devices require a significant amount of power.

What is needed is a system and method that can effectively, deter theft by making use of existing security systems to alert individuals to potential theft, track items, and identify ownership of portable devices without the aid of satellites.

BRIEF SUMMARY

One embodiment disclosed herein relates to a method for providing security for a portable electronic device that includes an embeddable security device. The method comprises an act of transmitting a first signal to the remote portable device to determine whether the embeddable security device and a remote portable device are proximate one another; in response to determining that the embeddable security device and the remote portable device are not proximate, an act of determining an amount of time that the embeddable security device and the remote portable device are not proximate one another; and an act of transmitting a second signal in response to the embeddable security device and the remote portable device being not proximate for a predetermined amount of time, the second signal being configured to activate an external alarm system to thereby cause the external alarm system to emit an alarm signal.

Another embodiment disclosed herein relates to a system for providing security for an electronic device in an environment. The system comprises an embeddable security device configured to be embedded in a device, the embeddable security device including at least a transmitter, a receiver, and logic configured to transmit and/or receive a first signal and a second signal; a portable device that is remote from the embeddable security device configured to be linked to the embeddable security device, the remote portable device including at least a transmitter, a receiver, and logic, wherein the remote portable device transmits the first signal to or receives the first signal from the embeddable security device so as to determine that the embeddable security device is proximate the remote portable device; and an alarm system that is external to the embeddable security device, wherein the alarm system is configured to produce an alarm signal upon receiving the second signal when the embeddable security device is proximate the alarm system, the second signal being transmitted when the remote portable device is not proximate the embeddable security device.

A further embodiment disclosed herein relates to a portable device that comprises a body, a power supply within the body; and a security device embedded within the body. The security device comprises an antenna, a memory, control logic, a power supply; and transmission and reception circuitry. The security device is configured to transmit a first signal to a remote portable device when operating in a first mode and to transmit a second signal configured to activate an external alarm system when operating in a second mode, the second mode of operation being entered upon a determination that the portable device is not proximate the remote portable device for a predetermined amount of time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teaching herein. The features and advantages of the teaching herein may be realized and obtained by means of the instruments and combinations particularly pointed out in the appended claims. These and other features will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which.

DETAILED DESCRIPTION

Reference will now be made to figures wherein like structures will be provided with like reference designations. It is understood that the drawings are diagrammatic and schematic representations of presently preferred embodiments of the invention, and are not limiting of the present invention nor are they necessarily drawn to scale. It will also be understood that reference to an element as a "first", "second" etc. element is for the purposes of distinguishing the elements and is not meant to imply sequential ordering unless explicitly stated.

Figure 1:
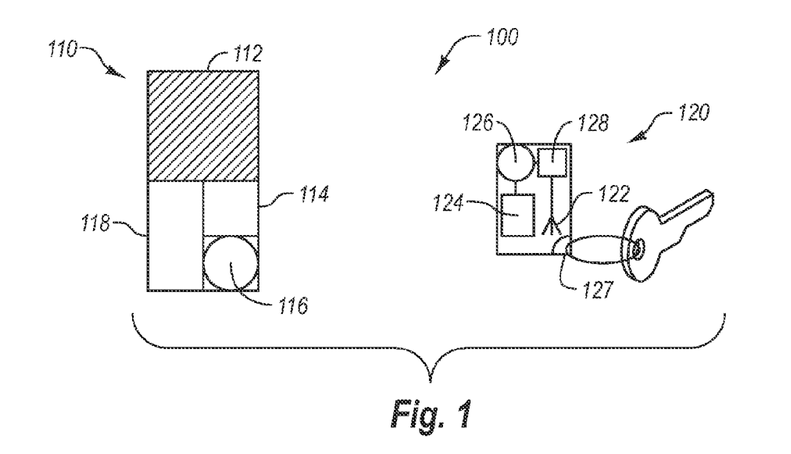
FIG. 1 depicts an embodiment of a tracking, identification and security system in accordance with the principles of the present invention.

FIG. 1 depicts an embodiment of a tracking, identification and security system 100 in accordance with the principles of the present invention. In the embodiment depicted in FIG. 1, the system is comprised of an embeddable security device 110 and a remote portable device 120. In the embodiment depicted in FIG. 1, the embeddable security device 110 can include an antenna 112, a memory 114, a power supply 116 and control/filtering/transmission/reception circuitry 118 and the remote portable device 120 can include an antenna 122, a memory 124, a power supply 126 and control/filtering/transmission/reception circuitry 128.

In some embodiments the antenna 112 of the embeddable security device 110 can be a flat antenna. However, in alternate embodiments the antenna 112 can be a more conventional linear antenna. In still further alternate embodiments, the antenna 112 can be any known and/or convenient device capable of transmitting and/or receiving a signal.

In addition, the memory 114 in some embodiments can be volatile and/or non-volatile random access memory. However, in alternate embodiments the memory 114 can be any desired type of volatile and/or non-volatile memory. In some embodiments the memory 114 can be read-only memory and/or single-write read-only memory and/or any other known and/or convenient mechanism capable of storing data and/or instructions. In an exemplary embodiment, memory 114 may include a unique identification code such as serial number that may used to link embeddable security device 110 to a particular remote portable device 120. In addition, the memory 114 may include user identification such as the name, address, and other personal information of the owner of a device in which embeddable security device 110 has been embedded.

Further, the power source 116 can be any conventional battery. However, in alternate embodiments, the power source 116 can be a rechargeable battery, a gyroscopic and/or self-winding-type mechanism, a connection panel to an exterior power source, an antenna capable of converting radio signals and/or other signals into power, and/or any other known and/or convenient power source.

The control/filtering/transmission/reception circuitry 118 can be comprised of circuitry capable of filtering, transmitting and/or receiving a signal at a desired frequency and/or with a desired frequency band. The circuitry 118 may also include a counter and control logic as known in the art. In some embodiments the transmitter can include a simple RLC circuit coupled with a transistor. However, in alternate embodiments more sophisticated circuitry can be used and in still further alternate embodiments any known and/or convenient circuitry capable of filtering, transmitting and/or receiving a signal can be used.

In operation, the embeddable security device 110 can be powered by the power source 116 enabling the memory 114 to send and/or receive signals via the circuitry 118 and the antenna 112. In some embodiments the embeddable security device 110 can be a Radio Frequency Identification chip (RFID). Of course, it will be appreciated that embeddable security device 110 may be other reasonable devices known to those of skill in the art.

Turning now to remote portable device 120, in some embodiments the antenna 122 of the remote portable device 120 can be a flat antenna. However, in alternate embodiments the antenna 122 can be a more conventional linear antenna. In still further alternate embodiments, the antenna 122 can be any known and/or convenient device capable of transmitting and/or receiving a signal.

Moreover, in some embodiments the remote portable device 120 can include an attachment region 127 capable of selectively engaging a desired item, such as a keychain. In the embodiment depicted in FIG. 1, the attachment region 127 is depicted as a penetration in an exterior housing 125 of the remote portable device 120. However, in alternate embodiments any known and/or convenient attachment mechanism can be used. Accordingly, in most embodiments, a user of system 100 will keep remote portable device 120 on his or her person.

In addition, the memory 124 can be volatile and/or non-volatile random access memory. However, in alternate embodiments the memory 124 can be any desired type of volatile and/or non-volatile memory. In other embodiments the memory 124 can be read-only memory and/or single-write read-only memory and/or any other known and/or convenient mechanism capable of storing data and/or instructions. In an exemplary embodiment, memory 124 may include a unique identification code such as serial number that may used to link the particular remote portable device 120 to embeddable security device 110. In this manner, the remote portable device 120 and embeddable security device 110 may communicate with one another as will be explained in more detail to follow. In addition, the memory 124 may include user identification such as the name, address, and other personal information of the owner of a device in which embeddable security device 110 has been embedded.

Further, the power source 126 can be a conventional battery. However, in alternate embodiments, the power source 126 can be a rechargeable battery, a gyroscopic and/or self-winding-type mechanism, a connection panel to an exterior power source, an antenna capable of converting radio signals and/or other signals into power, and/or any other known and/or convenient power source.

In some embodiments, the control/filtering/transmission/reception circuitry 128 can be comprised of any desired circuitry capable of filtering, transmitting and/or receiving a signal at a desired frequency and/or with a desired frequency band. The circuitry 128 may also include a counter and control logic as known in the art. In some embodiments the transmitter can include a simple RLC circuit coupled with a transistor. However, in alternate embodiments more sophisticated circuitry can be used and in still further alternate embodiments any known and/or convenient circuitry capable of filtering, transmitting and/or receiving a signal can be used.

In operation, the remote portable device 120 can be powered by the power source 126 enabling the memory 124 to send and/or receive signals via the circuitry 128 and the antenna 122. The remote portable device 120 may also transmit the unique identification code in response to receipt of an appropriate polling signal transmitted from the embeddable security device 110. Alternatively, the remote portable device 120 may automatically transmit the unique identification code at continuously or at periodic intervals.

Likewise, the embeddable security device 110 can be adapted to emit a first prescribed signal from memory 114, which is also referred to hereinafter as a polling signal. In some embodiments, the first prescribed signal can be a radio frequency (RF) signal. Of course, it will be appreciated that in still further alternate embodiments, the first prescribed signal can be any known and/or convenient audible, non-audible, visual, invisible and/or modulated signal in any desired frequency range and/or spectrum.

In other words, the embeddable security device 110 can transmit a signal from memory 114 at a prescribed interval and/or continuously. If the remote portable device 120 receives the signal and in response transmits a signal which is received by the embeddable security device 110, then the embeddable security device 110 will default to a first mode of operation until it again sends a polling signal to the remote portable device 120. However, if the remote portable device 120 fails to respond and/or the embeddable security device 110 does not receive an appropriate response signal within a prescribed period of time, then the embeddable security device 110 will enter a second mode and can begin to emit a second prescribed signal, hereinafter also referred to as an alarm or an alert signal.

In some embodiments the second prescribed signal can be a signal selected to activate inventory control systems, such as Electronic Article Surveillance (EAS) systems, located in many stores and/or public places, which are examples of an external alarm system. In alternate embodiments, the second prescribed signal can be any desired signal adapted to activate any desired external alarm system and/or systems. In an exemplary embodiment, the second prescribed signal may be one of a frequency such as 8.2 MHz, 4.6 MHz, 3.25 MHz, 1.99 and 2.0 MHz, 1.81 MHz, 500 MHz, 58 KHz, and 9.5 MHz that is configured to activate the external alarm system or inventory control system as will be explained in more detail to follow.

It will be appreciated that in alternate embodiments the polling system can be reversed, inasmuch as the remote portable device 120 can poll the embeddable security device 110 and the embeddable security device 110 may then send the first prescribed signal in response. If the embeddable security device 110 does not receive a polling signal within a prescribed period of time, the embeddable security device 110 will enter the second mode and can begin to emit the alert signal previously described.

In some embodiments, the embeddable security device 110 and/or the remote portable device 120 can continue to broadcast the polling signal and in the event that the polling signal receives an appropriate response, the emission of the second prescribed signal and/or alert signal can be terminated. In addition, the system 100 can be configured such that the embeddable security device 110 and the remote portable device 120 must be within a prescribed range in order for the polling signal to be received to prevent activation of the second prescribed signal and/or alert signal. Such range can be readily established by the selection of appropriate components of the embeddable security device 110 and the remote portable device 120.

Figure 2:
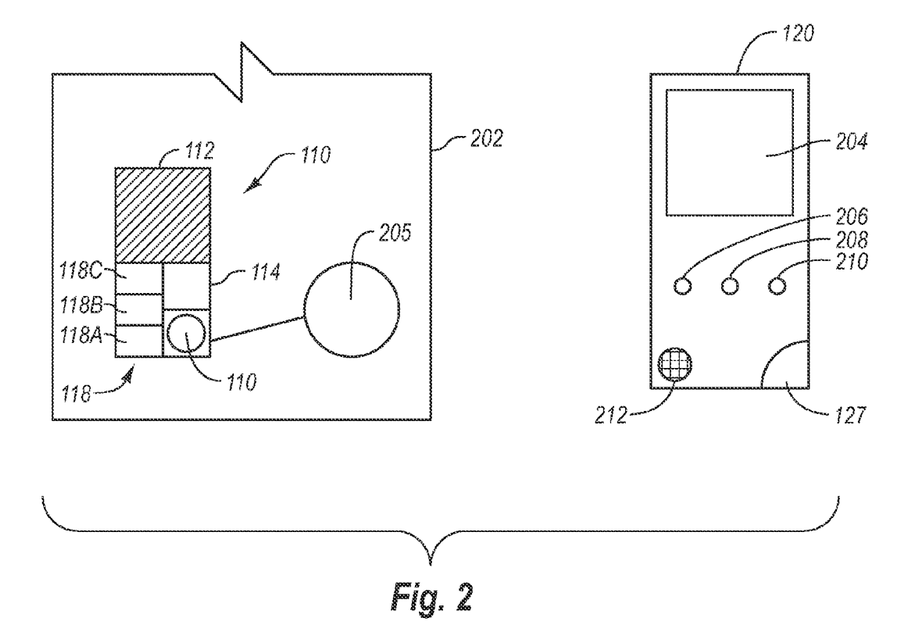
FIG. 2 depicts an alternate embodiment of the tracking, identification and security system depicted in FIG. 1.

Reference is now made to FIG. 2, which depicts an alternate embodiment of the system depicted in FIG. 1. In the embodiment depicted in FIG. 2, the embeddable security device 110 is shown as being embedded in an electronic device 202 such as for example, but not limited to, a laptop computer, a MP3 player, an IPod, or the like. Of course, it will be appreciated that embeddable security device 110 may be embedded in devices other than an electronic device. As shown, embeddable security device 110 is coupled with a power source 205 of the electronic device 202. In other embodiments, the power source 205 can be a separate power source of any desired selection such as an external power source.

In one embodiment, embeddable security device 110 may be embedded as part of a simple circuit between a hard drive or mother board of electronic device 202 and the power supply 205. In such embodiment, the embeddable security device 110 may act as a power gateway for the electronic device 202. As will be explained in more detail to follow, this allows embeddable security device 110 to prevent power to the electronic device 202 in certain circumstances.

As also shown, in one embodiment circuitry 118 may specifically include a receiver 118A configured to receive signals from the remote portable device 120 or other external devices. Circuitry 118 also includes a transmitter 118B configured to transmit signals to the remote portable device 120 or other external devices. A counter 118C is configured to sync in time with the counter of the remote portable device 120. In some embodiments, a second counter may also be included as part of circuitry 118.

FIG. 2 also illustrates an additional embodiment of the remote portable device 120. In the illustrated embodiment, the remote portable device 120 includes a display 204, buttons 206, 208, 210, and a speaker 212. Of course, it will be appreciated that additional buttons and other features may be included as part of remote portable device 120 as circumstances warrant.

In the illustrated embodiment, the display 204 can provide a user with various information regarding the remote portable device 120 and/or embeddable security device 110, such as the state and/or battery power of the remote portable device 120 and/or the embeddable security device 110. The display 204 may also display the user/owner information stored in memories 114 and/or 124 previously described to facilitate identification of the owner of electronic device 202. In some embodiments the display 204 can be in an always-on state. However, in alternate embodiments, the display and/or speaker 212 can be activated by depressing one or more of the buttons 206, 208, 210 or can be activated by the failure of the remote portable device 120 to receive a polling signal for a prescribed period of time.

In one embodiment, button 206 can act as an "arm" button, such that when button 206 is depressed, a signal can be transmitted to the embeddable security device 110 indicating that the polling signals should be emitted, as described above. Button 208 can act as a "disarm" button, such that when button 208 is depressed, a signal can be transmitted to the embeddable security device 110 indicating that polling signals should not be emitted and that the second prescribed signal and/or alarm signal should not be emitted. Button 210 can act as a "kill switch," such that when button 210 is depressed, a signal can be transmitted to the embeddable security device 110 that causes the embeddable security device 110 to enter a state in which it becomes inoperable as will be explained in more detail to follow. In some embodiments, depression of the buttons 206, 208, 210 can place remote portable device 120 in a programming and/or pairing mode, in which the remote portable device 120 can actively sync with the embeddable security device 110 and/or provide the embeddable security device 110 with any desired data and/or receive any desired data from the embedded device.

Figure 3:
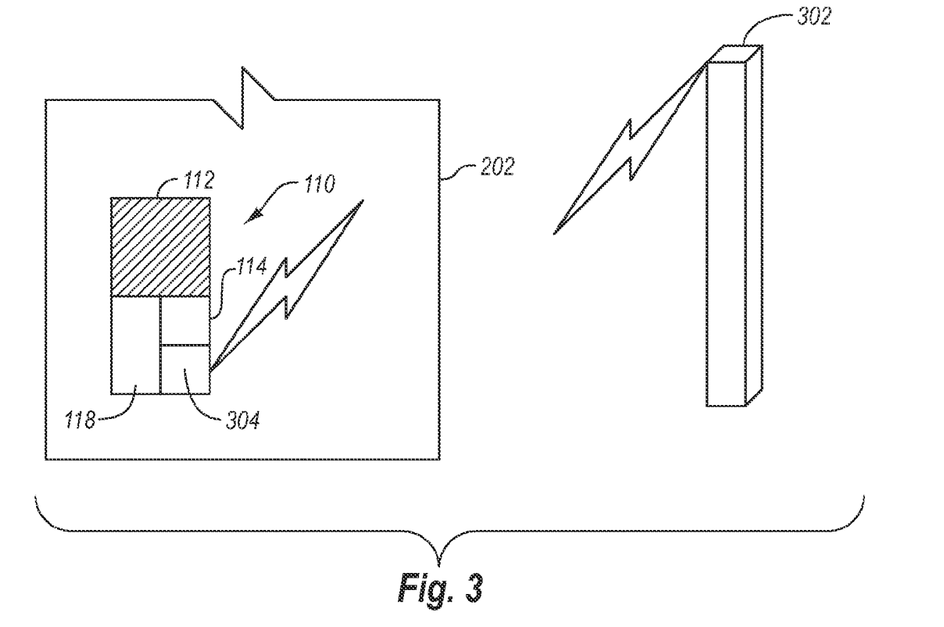
FIG. 3 depicts an embodiment of the tracking, identification and security system depicted in FIGS. 1-2 in operation.

Turning now to FIG. 3, an alternate embodiment of when embeddable security device 110 operates in a passive mode is illustrated. In the embodiments depicted in FIG. 3, the embeddable security device 110 can receive a signal from any desired source and generate power from the received signal of an external security system 302. The minute electrical current induced in the antenna 112 by the incoming radio frequency signal provides just enough power for the circuitry 118, specifically transmitter 118B, to power up and transmit a response. In some embodiments the power can be generated by backscattering the carrier wave from the external security system 302 via a secondary antenna 304. However, in alternate embodiments, a single antenna can be used to accomplish this task. However, this means that the antenna 112 should be designed both to collect power from the incoming signal and also to transmit the outbound backscatter signal.

Figure 4:
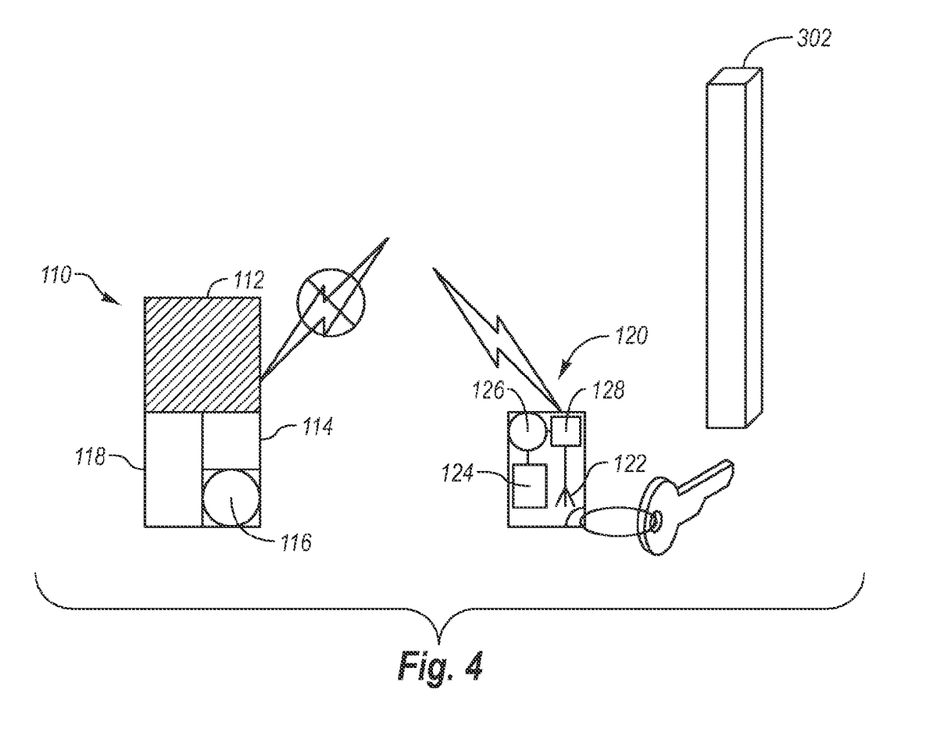
FIG. 4 depicts an alternate embodiment of the tracking, identification and security system depicted in FIGS. 1-3.

FIG. 4 depicts an embodiment of the system 100 in operation. In operation, when the remote portable device 120 and the embeddable security device 110 are within the prescribed proximity and the polling signal is being appropriately responded to, then the embeddable security device 110 will not emit the second prescribed signal and will not trigger the external security system 302. However, if the polling or first prescribed signal is not appropriately responded to, the embeddable security device 110 will emit the second prescribed or alert signal and thus activate the external security system 302.

Figure 5:
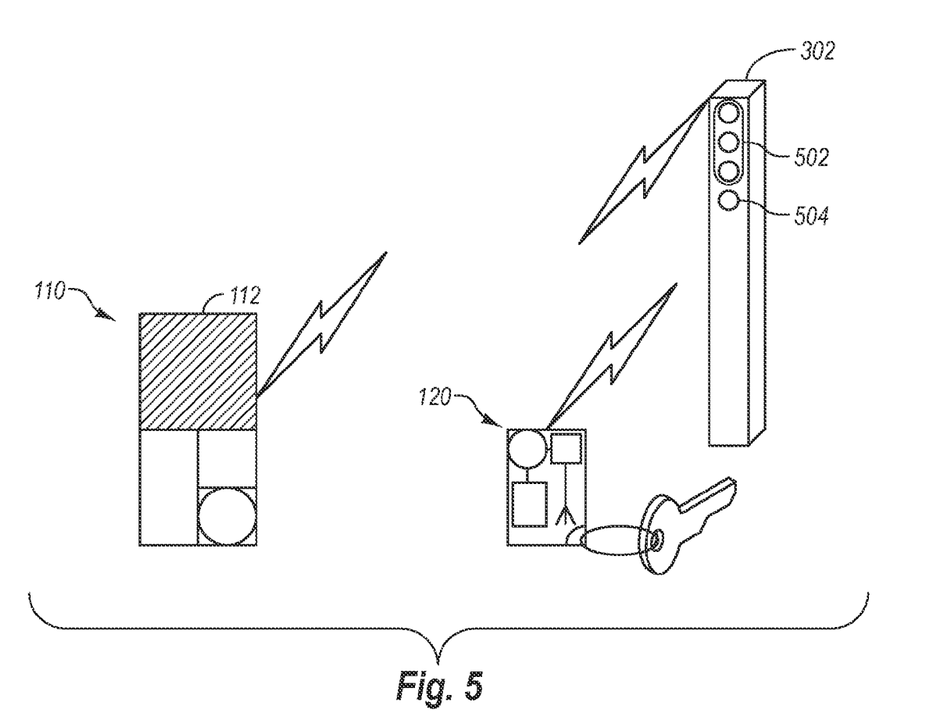
FIG. 5 depicts an alternate embodiment of the tracking, identification and security system depicted in FIGS. 1-4.

Reference is now made to FIG. 5, which depicts an alternate embodiment of the system depicted in FIG. 4. In the embodiment depicted in FIG. 5, the embeddable security device 110 can constantly broadcast an alert signal. The alert signal is detected by the external security system 302 and the external security system 302 can broadcast a signal in response requesting authentication from the remote portable device 120. The remote portable device 120, if present, can respond to the security system 302 by signaling that the movement of the embeddable security device 110 past the security system 302 is approved.

In the event that the remote portable device 120 is not present, the security system 302 can record a date and time that the embeddable security device 110 passed the security system. The security system 302 can also probe the embeddable security device 110 and/or merely receive information about the embeddable security device 110 such as information regarding ownership of the device in which the embeddable security device 110 is embedded, for example electronic device 202, and record such information and/or transmit such information to a security agency and/or appropriate authority. In some embodiments, the security system 302 can be embedded in a traffic signal 502 and if the traffic signal is equipped with a camera 504, as is common at some intersections, the security system 302 can be adapted to record an image or images of the surrounding area and either store and/or forward such information and image(s) to a desired location.

Figure 6:
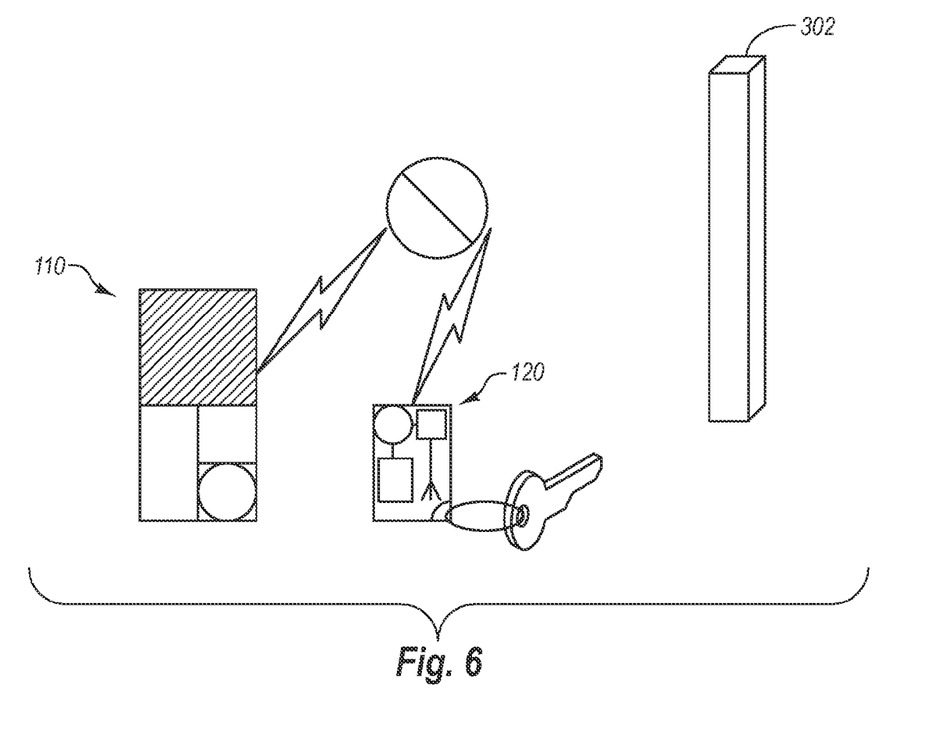
FIG. 6 depicts an alternate embodiment of the tracking, identification and security system depicted in FIGS. 1-5.

Turning now to FIG. 6, an alternate embodiment of the system 100 is illustrated. In the embodiment illustrated in FIG. 6, the embeddable security device 110 can be configured to emit an alert signal at prescribed intervals and/or continuously and the remote portable device 120 can be configured to emit a destructive interference signal at the same interval and/or continuously. Thus, if the remote portable device 120 is proximal to the embeddable security device 110, the security system 302 will not be activated as the emitted alert signal will be interfered with prior to reaching the security system. However, if the remote portable device 120 is not proximal to the embeddable security device 110, the embeddable security device 110's alert signal will not be impacted and the security system can be activated.

Figure 7:
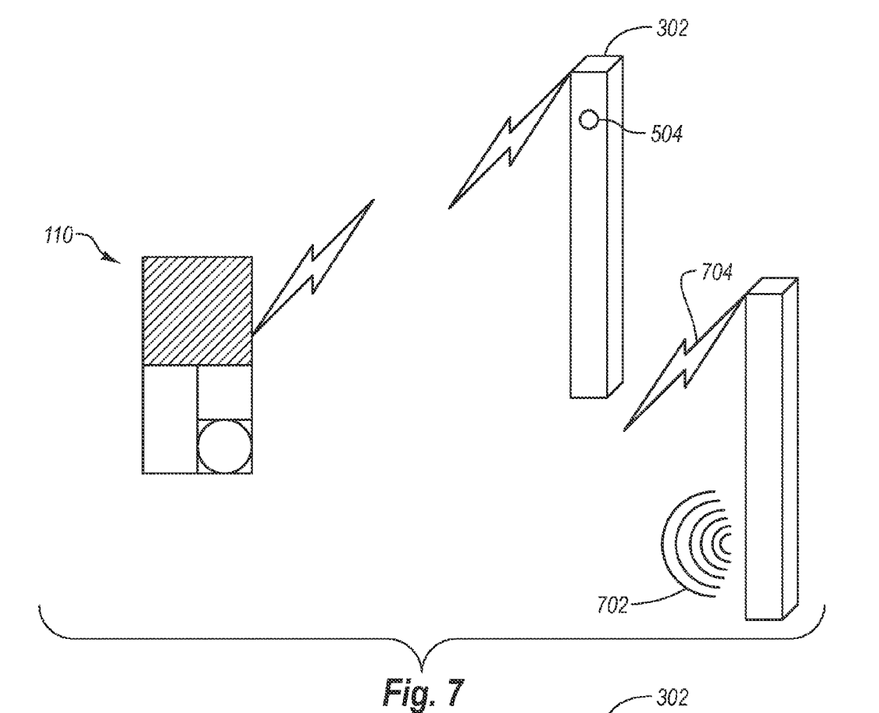
FIG. 7 depicts an alternate embodiment of the tracking, identification and security system depicted in FIGS. 1-6.

FIG. 7 depicts an embodiment of the system 100 in which the remote portable device 120 is not present. In the embodiment depicted in FIG. 7, the embeddable security device 110 is actively and/or passively emitting an alert signal, either by its own power source or being powered by the signal of a security system 302. In the embodiment depicted, the security system 302, when detecting the alert signal, can record data from the embeddable security device 110 together with date and time information and/or images, via camera 504. Additionally, in some embodiments, the security system, if so equipped, can emit an audible signal 702 and/or inaudible signal 704 to alert security and/or any third party to the unauthorized transportation of the device in which the embeddable security device 110 is located.

Figure 8:
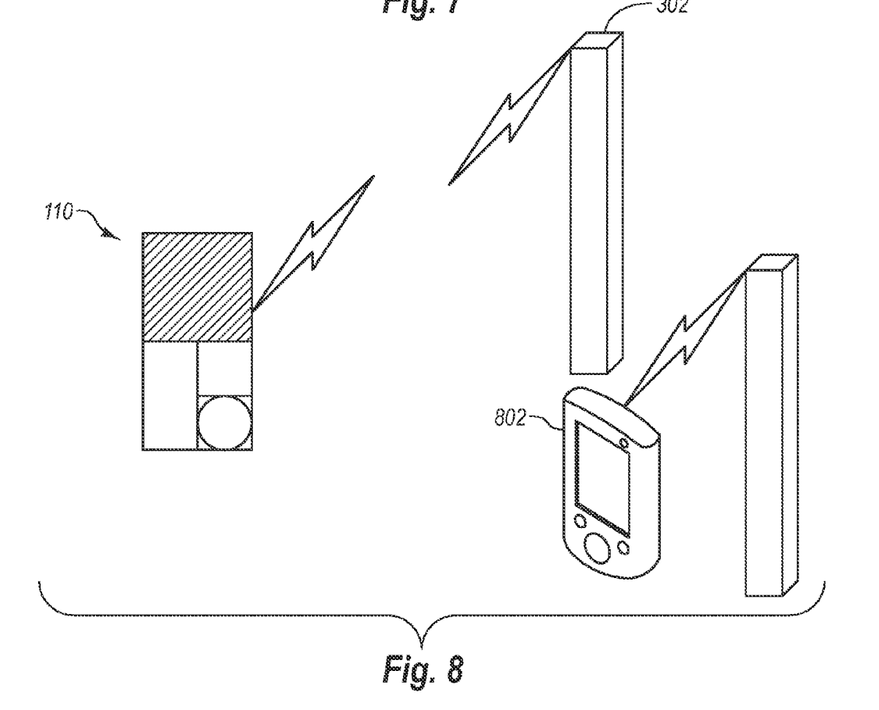
FIG. 8 depicts an alternate embodiment of the tracking, identification and security system depicted in FIGS. 1-7.

FIG. 8 depicts an alternate embodiment of the system 100 in which the remote portable device 120 is not present. In the embodiment depicted in FIG. 8, the embeddable security device 110 is actively and/or passively emitting an alert signal, either by its own power source or being powered by the signal of a security system 302. In the embodiment depicted, the security system 302, upon detecting the alert signal, can record data from the embeddable security device 110 together with date and time information and/or images. Additionally, in some embodiments, the security system 302, if so equipped, can transmit a signal to a desired third device 802 to alert the user of the third party device 802 to the unauthorized transportation of the device in which the embeddable security device 110 is located. In some embodiments the third device 802, can be integrated into the remote portable device 120, thus alerting the user.

Figure 9:
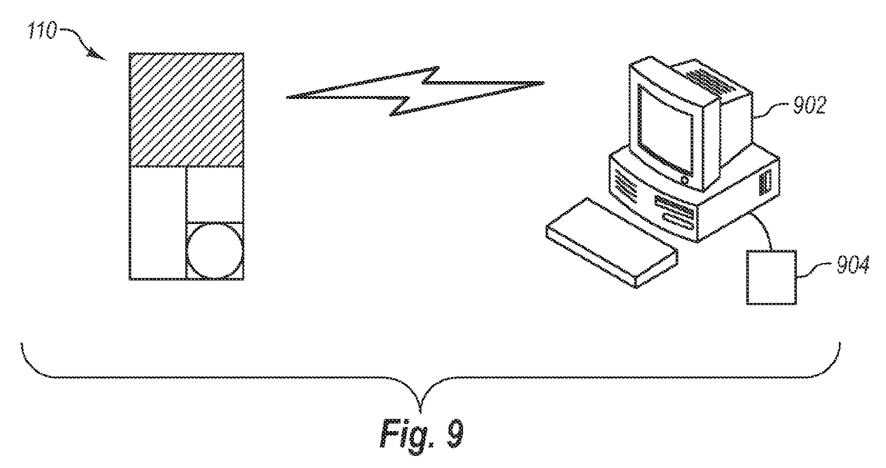
FIG. 9 depicts an embodiment of an interaction mechanism for the tracking, identification and security system depicted in FIG. 1-8.

Referring now to FIG. 9, the system 100 in operation at a time of programming is illustrated. In some embodiments the embeddable security device 110 can be programmed with desired information either wirelessly or via a wired interface with a machine 902 that is configured for programming the embeddable security device 110, either directly or indirectly. For instance, in one embodiment the machine 902 may be used to directly program the embeddable security device 110. In other embodiments, the machine 902 is used to program the desired information into remote portable device 120, which then programs the embeddable security device 110. Machine 902 may include a slot configured to receive the device 202 that includes the embeddable security device 110. Alternatively, machine 902 may receive remote portable device 120.

The information stored on the embeddable security device 110 can include user/owner information such as, but not limited to, name, address, telephone number, e-mail address, and/or any other desired information such as the identification code previously described. In some embodiments, the information can also include digitized information related to a biometric of the owner, such as a finger print. Thus, in some embodiments, in order to reprogram the embeddable security device 110, the machine 902 can be provided with a biometric scanning device 904 adapted to receive the necessary biometric information from a user before the embeddable security device 110 will allow modification of the information stored on the embeddable security device 110 in memory 114. In one embodiment, the machine 902 may be owned and operated by a manufacturer and/or authorized vendor of embeddable security device 110 in order to prevent unauthorized modification of the information stored on the embeddable security device 110. For example, the owner of machine 902 may require a user of embeddable security device 110 to provide identification before allowing the modifications to be performed.

Figure 10:
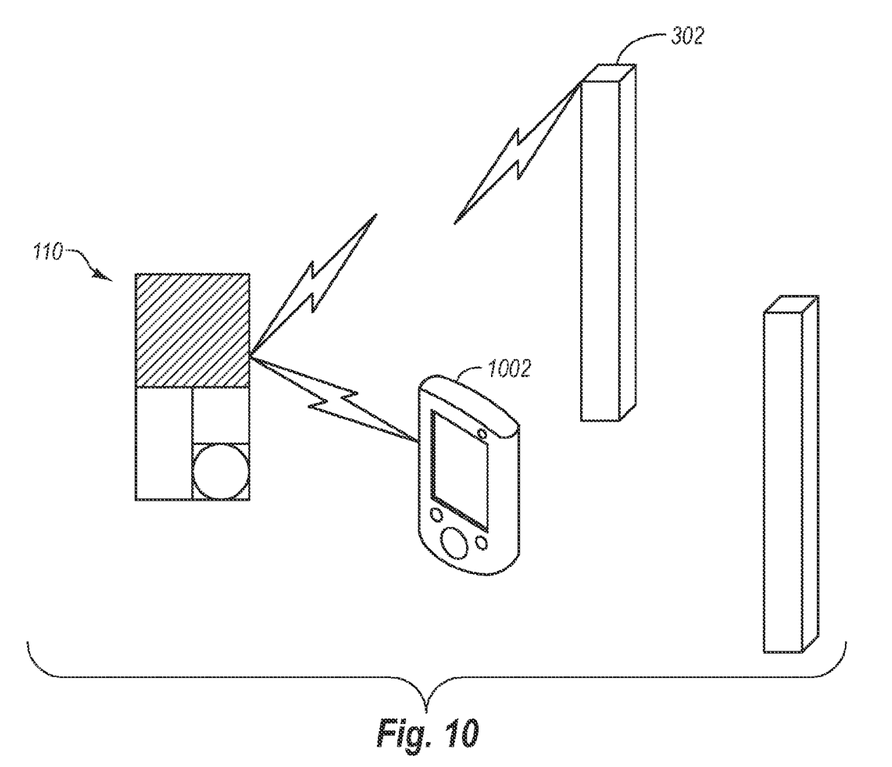
FIG. 10 depicts an alternate embodiment of the tracking, identification and security system depicted in FIGS. 1-8.

FIG. 10 depicts an alternate embodiment of the system 100. In operation, if the embeddable security device 110 passes the security device 302 without being in proximity to the remote portable device 120, the embeddable security device 110 can enter a high-power transmission mode, in which the broadcast range of the embeddable security device 110 can be markedly increased. The embeddable security device 110 can emit a signal that can be received by either a third device 1002, such as a mobile telephone, and immediately alert the owner of the device to the unauthorized movement of the device containing the embeddable security device 110. In some embodiments the third device 1002 can simple be integrated into the remote portable device 120 which can the alert the user.

Figure 11:
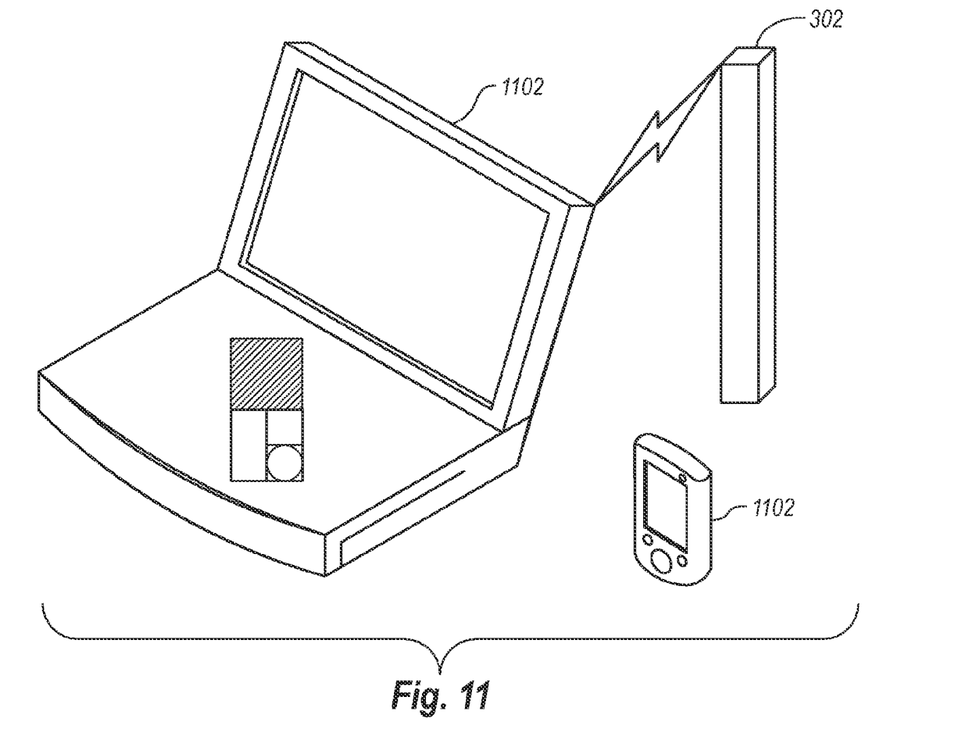
FIG. 11 depicts an alternate embodiment of the tracking, identification and security system depicted in FIGS. 1-8 and 10.

FIG. 11 depicts an embodiment of the system 100 in which the embeddable security device 110 is located within a laptop computer 1102. In the embodiment depicted in FIG. 11, when the embeddable security device 110 passes the security device 302, without being proximal to the remote portable device 120, an audible alarm on the security device will be activated. A third device 1102 can then be used to retrieve the ownership information stored on the embeddable security device 110. For example, the third device 1102, which may be used by security personal attached to the location of security device 302, may be configured with a display 1104, a button 1106, and an internal receiver and transmitter, which may be any reasonable receiver and transmitter. In operation, the third device 1102 contacts embeddable security device 110 via the internal receiver and transmitter and asks the embeddable security device 110 to read the user information stored in memory 114. This information may then be shown on the display 1104.

Figure 12:
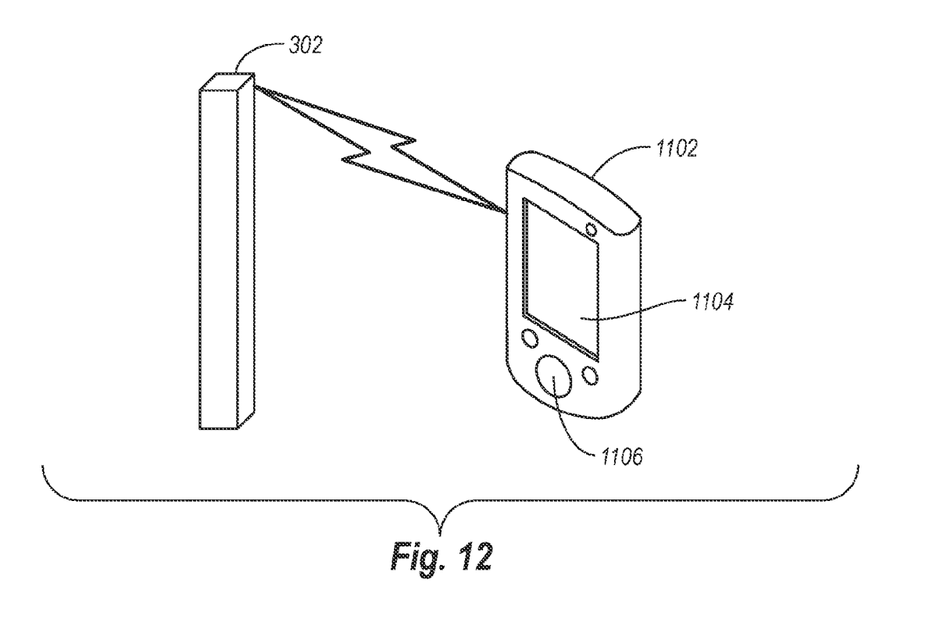
FIG. 12 depicts an alternate embodiment of an interaction mechanism for the tracking, identification and security system depicted in FIG. 1-11.

FIG. 12 depicts an alternate embodiment of the system 100 depicted in FIG. 11, in which the security device 302 can capture the ownership information from the embeddable security device 110. This ownership information can then be read out of the security device 302 by use of a third device 1102 in the manner previously described.

Figure 13:
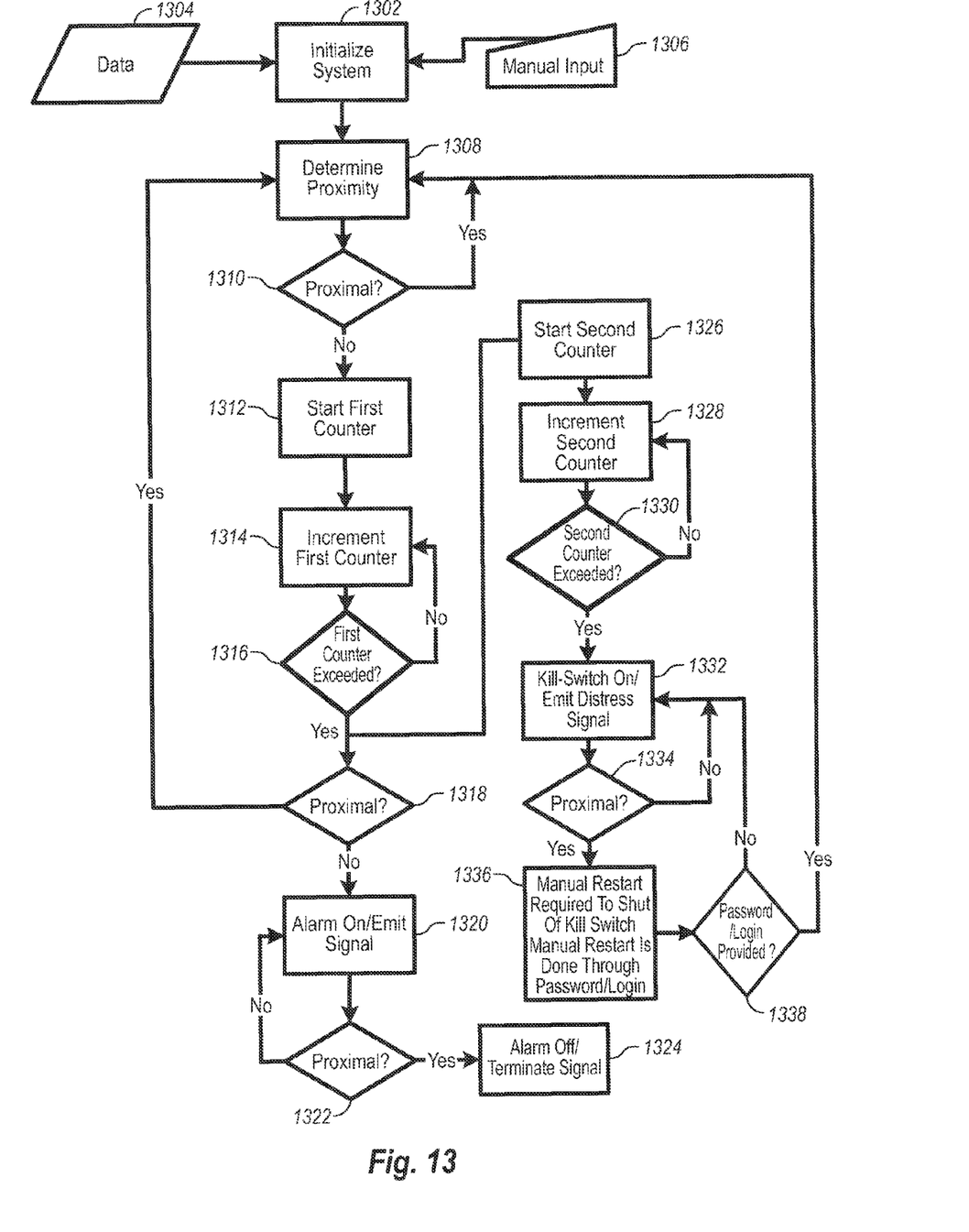
FIG. 13 depicts a method of operation of the tracking, identification and security system depicted in FIG. 1-12.

Turning now to FIG. 13, a method of operation of the system 100 described above is illustrated. In step 1302 the embeddable security device 110 and the remote portable device 120 are initialized with data 1304 and manual input 1306, which can include any desired security and/or owner information as previously described.

In step 1308, the proximity of the remote portable device 120 and the embeddable security device 110 are determined, for example using the polling process previously described. In step 1310, the proximity is analyzed. If the two devices are proximal (Yes in step 1310), then the system returns to step 1308. If the two devices are determined not to be proximal (No in step 1310), a first counter, such a counter 118C, is started in step 1312.

In steps 1314 and 1316 the first counter is incremented. If the first counter exceeds a predetermined count (Yes in step 1316), the proximity is again determined in step 1318. If the remote portable device 120 and embeddable security device 110 are determined to be proximal (Yes in step 1318), then the system resets to step 1308. If the two devices are determined to still not be proximal (No in step 1318), an alarm signal, such as the second signal, is emitted in step 1320. If after the alarm signal begins to emit, the devices again become proximal, the alarm signal is terminated device system returns to 1308.

In addition, when the first counter exceeds the predetermined count in step 1316, a second counter is started in step 1326 and incremented in step 1328. If the second counter exceeds a predetermined count (Yes in step 1330), the embeddable security device will enter a third or kill-switch mode in step 1332. As described above, this mode will cause the embeddable security device 110 to make the portable device in which it is embedded inoperable while still be able to emit the second or alarm signal, which is also known as a distress signal. Note that the second counter will continue to increment and will not exceed its predetermined count if the remote portable device 120 and embeddable security device 110 are determined to be proximal in steps 1318 or 1322.

If the remote portable device 120 and embeddable security device 110 are determined to be again proximal (Yes in step 1334), then a manual reset of the system is required in step 1336 to leave the third mode and make the device operable again. This may be done by entering a password that may be part of the security information previously discussed. If the password is entered (Yes in step 1338), the system returns to step 1308. If the remote portable device 120 and embeddable security device 110 are not determined again be proximal (No in step 1334), or if the password is not entered (No in step 1338), the system will remain in the third or kill-switch mode.

Figure 14:
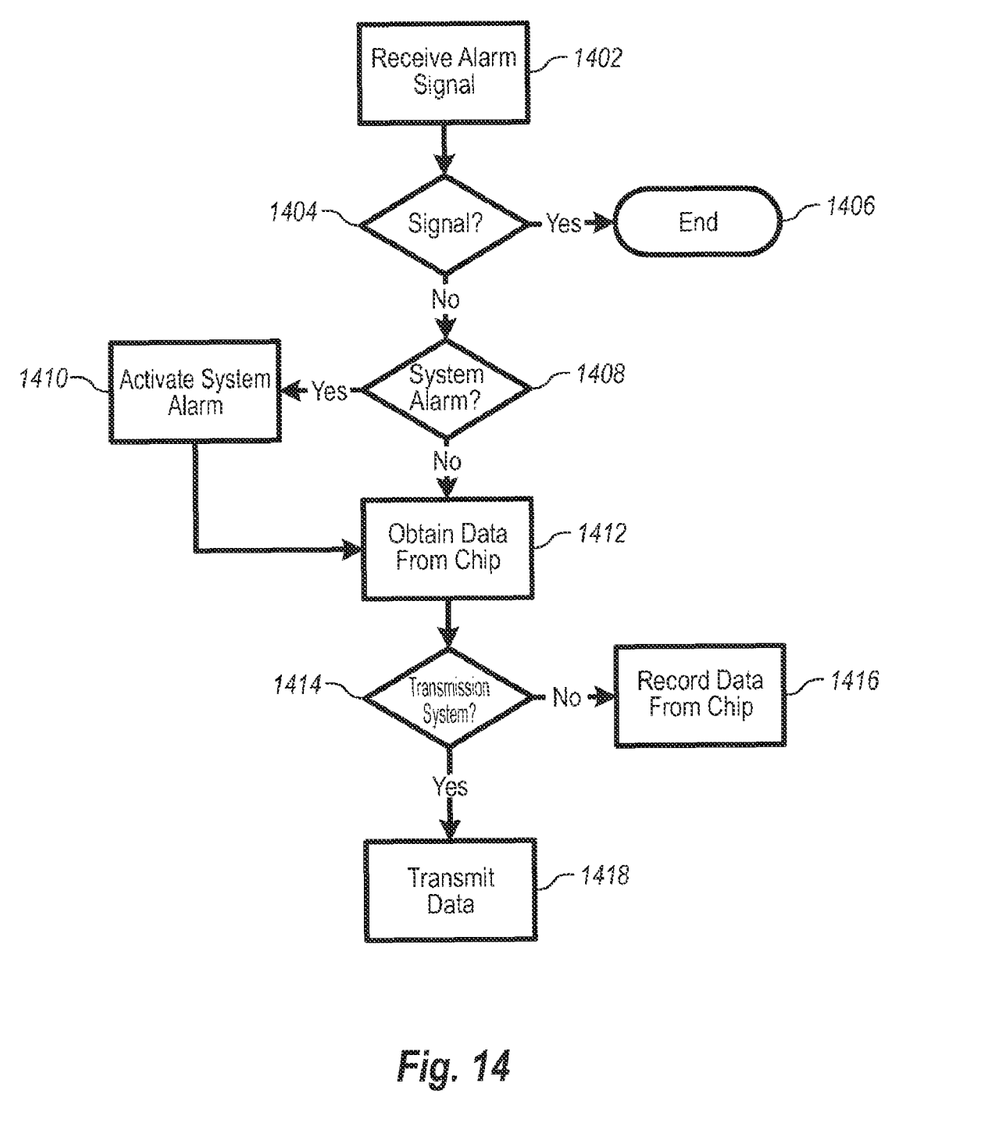
FIG. 14 depicts a method of operation of the tracking, identification and security system depicted in FIG. 1-12.

Similarly, FIG. 14 illustrates an embodiment of an operation mechanism of recording data if a security breach is detected. In step 1402, an alarm signal is detected. In response to the alarm system, a remote portable device signal is searched for in step 1402. If the remote portable device signal is detected (Yes in step 1404), the process is terminated in step 1406. If no remote portable device signal is detected (No in step 1404), then the system determines if an alarm system is available in step 1408. If an alarm system is detected (Yes in step 1408) then the alarm system is activated in step 1410. If no alarm system is detected (No in step 1408) then the system obtains data from the embeddable security device 110 in step 1412. In step 1414 the system determines if the system is equipped with a transmission system. If the system does not have a transmission system (No in step 1414), then the information is recorded in step 1416. If the system is equipped with a transmission system (Yes in step 1414), then the information is transmitted in step 1418.

Having explained the principles of the present invention generally, a specific example will now be described with reference to the figures previously described. The purpose of the specific example is to further clarify the principles of the present invention and should not be used to limit the scope of the appended claims. Those of skill in the art after having read this description will appreciate that numerous examples may fall within the scope of the present invention.

First, an electronic device 202 that includes an embeddable security device 110 is bought by a user. The embeddable security device 110 in this example is embedded as a gateway between the power supply and the rest of the electronics of device 202 as previously described. The user then takes device 202 and a remote portable device 120 to a programming machine such as programming machine 902 owned by the seller of device 202 and activates the embeddable security device 110 and remote portable device 120 by linking the two devices. For example, the programming machine 902 may provide both devices with the unique identification that allows embeddable security device 110 and remote portable device 120 to know they are linked. In addition, the user information previously described may be entered into embeddable security device 110 and remote portable device 120.

At this point, the polling operation between the embeddable security device 110 and remote portable device 120 may begin. In other words, embeddable security device 110 enter the first mode, also known as a guard mode, and will send out the first prescribed signal in response to the polling signal received from remote portable device 120. As long as embeddable security device 110 is in the first or guard mode, it will continue to send out the first prescribed signal to the remote portable device 120 in response to the polling signals. As described, the first signal may be sent either continuously or according to a predetermined time period. In some situations, the user may cause remote portable device 120 to send a signal to embeddable security device 110 to enter a fourth or dormant mode. In such mode, device 202 will still be operational, but embeddable security device 110 will not send out any signals.

As mentioned, as long as embeddable security device 110 is in the first or guard mode, it will continue to send out the first prescribed signal to the remote portable device 120 in response to the polling signals. However, when embeddable security device 110 and remote portable device 120 become separated, the first counter in both devices begins to increment. If the two devices are separated from each other long enough that their counters exceed a predetermined limit, then both devices will enter the second or distress mode. In this second mode, remote portable device 120 may switch its display to indicate the mode and will continue to poll embeddable security device 110 so as to determine if the device 202 containing embeddable security device 110 is in close proximity. The embeddable security device 110, on the other hand, will begin to emit the second prescribed signal. As mentioned previously, the second prescribed signal is configured to activate an external alarm system. In some embodiments, the second prescribed signal may also cause embeddable security device 110 to emit an audio or visual signal.

Returning to the specific example, suppose that the user, who has remote portable device 120 on his or her person, has simply left electronic device 202 in the library to go to the bathroom. The resulting separation of embeddable security device 110 and remote portable device 120 will cause both devices to enter the second or distress mode. However, since electronic device 202 is not actually moved, unless someone takes it, embeddable security device 110 will not pass through any external alarm systems present in the library and thus the emitted alarm or alert signal should not set off any alarms. When the user returns from the bathroom, embeddable security device 110 and remote portable device 120 will no longer be separated. As previously described, the embeddable security device 110 and remote portable device 120 will reestablish the polling operation and will reenter the first or guard mode. The user may then continue to use the equipment as usual.

Suppose, however, that while the user is in the library electronic device 202 is stolen, thus causing embeddable security device 110 and remote portable device 120 to become separated and to enter the second or distress mode as previously described. When the thief moves electronic device 202 through the external alarm system 302 typically found in a library, the alarm or alert signal being emitted by embeddable security device 110 will cause the alarm system 302 to sound an alarm. At this point the thief can be taken aside by appropriate security personal and device 202 can be confiscated and put into a lost and found.

The user may then produce remote portable device 120 in order to show his or her ownership of electronic component 202. As described, user identification information is included in the memory of both embeddable security device 110 and remote portable device 120. This information will allow the security personal to easily ascertain true ownership. Alternatively, the security personal may have access to a remote third device such as devices 802, 1002, or 1102 previously described. Such devices will allow the security personal to read the ownership information either from embeddable security device 110 or from alarm system 302 as described ascertain true ownership.

Returning to the specific example, suppose that electronic device 202 is stolen but is not recovered by the security personal. This could happen if the thief does not move device 202 through an external security system or the location of the theft does not have such a system. After a predetermined amount of time has passed, for example 30 minutes as determined by a second counter, embeddable security device 110 and remote portable device 120 may enter a third mode, also known as kill-switch mode. In this second mode, remote portable device 120 may switch its display to indicate the mode and will continue to poll embeddable security device 110 so as to determine if the device 202 containing embeddable security device 110 is in close proximity.

The embeddable security device 110, acting as a simple power switch between the power supply and the rest of the circuitry within the electronic device 202, simply disconnects the line from the power supply to the rest of the circuitry. Further, this is done in such a way that simply removing embeddable security device 110 from electronic device 202 will not restore the power, as embeddable security device 110 is an integrated/embedded part of the electronics and taking it out would either be very difficult or cause permanent damage to the electronics. Since embeddable security device 110 has its own internal battery, it can continue to output the alarm or alert signals that activate the alarms as discussed while in the third mode. Thus, the third mode provides a Denial of Profit from taking electronic device 202 because the device becomes inoperable. In addition, further action can be done during this mode, such as hard drive encryption or other information theft and denial of profit method. The embeddable security device 110 may be reset to become operable once again when it comes into the presence of remote portable device 120 or by being reset by a machine 902. A password or the like may be required to ensure that only the user of electronic device 202 may reset the device.

Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although the subject matter has been described in language specific to module features and/or methodological acts, it is to be understood that the subject matter defined in the appended claims is not necessarily limited to the specific features or acts described above. Rather, the specific features and acts described above are disclosed as Embodiments include general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A method for providing security for a portable electronic device, the portable electronic device including an embeddable security device, the method comprising:
   in response to a first signal not being received between the embeddable security device and a remote portable device, an act of determining that the embeddable security device and the remote portable device are not proximate;
   in response to determining that the embeddable security device and the remote portable device are not proximate, an act of determining an amount of time that the embeddable security device and the remote portable device are not proximate; and
   in response to the amount of time reaching a first threshold amount of time, an act of transmitting a second signal to an electronic article surveillance (EAS) system, the EAS system being external to both the embeddable security device and the remote portable device, the second signal being configured to cause the external EAS system to emit an alarm signal.

2. The method in accordance with claim 1, further comprising:
an act of initializing the embeddable security device such that the embeddable security device includes user identification information such that a second remote device can obtain and display the user identification information to confirm ownership of the portable electronic device that includes the embeddable security device.

3. The method in accordance with claim 2, wherein the act of initializing the embeddable security device includes:
an act of coupling the embeddable security device to an external machine; and
an act of using the external machine to transfer the user identification information to the embeddable security device.

4. The method in accordance with claim 1, further comprising:
in response to a signal being received between the embeddable security device and the remote portable device, an act of determining that the embeddable security device and the remote portable device are proximate; and
an act of ceasing to transmit the second signal in response to determining that the embeddable security device and the remote portable device are proximate.

5. The method in accordance with claim 1, further comprising:
in response to the amount of time reaching a second threshold amount of time that is larger than the first threshold amount of time, an act of causing the portable electronic device to become inoperable.

6. The method in accordance with claim 5, wherein the act of causing the portable electronic device to become inoperable comprises:
causing the embeddable security device to act as a power switch that disconnects a power supply from other circuitry of the portable electronic device.

7. A system for providing security for an electronic device in an environment, the system comprising:
an embeddable security device configured to:
in response to a first signal not being received between the embeddable security device and a remote portable device, determine that the embeddable security device and the remote portable device are not proximate;
in response to determining that the embeddable security device and the remote portable device are not proximate, determine an amount of time that the embeddable security device and the remote portable device are not proximate; and
in response to the amount of time reaching a first threshold amount of time, transmit a second signal to an electronic article surveillance (EAS) system, the EAS system being external to both the embeddable security device and the remote portable device, the second signal being configured to cause the external EAS system to emit an alarm signal.

8. The system in accordance with claim 7, further comprising the remote portable device.

9. The system in accordance with claim 8, further comprising the external EAS system.

10. The system in accordance with claim 8, wherein the remote portable device includes a display configured to display a mode of operation of the embeddable security device and one or more buttons configured to at least partially control the mode of operation.

11. The system in accordance with claim 7, further comprising:
a programming machine configured to program user information into the embeddable security device such that a second remote device can obtain and display the user information to confirm ownership of an electronic device that includes the embeddable security device.

12. The system in accordance with claim 7, wherein the embeddable security device is further configured to:
in response to the amount of time reaching the first threshold amount of time, transmit a third signal configured to notify a second portable device that the embeddable security device is not proximate the remote portable device.

13. A portable device comprising:
a body;
a power supply within the body; and
a security device embedded within the body, the security device comprising:
an antenna;
a memory;
control logic;
a power supply; and
transmission and reception circuitry, wherein the security device is configured to:
transmit a first signal to a remote portable device when operating in a first mode; and
when operating in a second mode, transmit a second signal configured to activate an electronic article surveillance (EAS) system that is external to both the security device and the remote portable device, the second mode of operation being entered upon a determination that the portable device is not proximate the remote portable device for a predetermined amount of time.

14. The portable device in accordance with claim 13, wherein the security device is configured to transmit signals at frequencies that are compatible with electronic article surveillance (EAS) systems, the frequencies including 8.2 MHz, 4.6 MHz, 3.25 MHz, 1.99 and 2.0 MHz, 1.81 MHz, 500 MHz, 58 KHz, and 9.5 MHz.

15. The portable device in accordance with claim 13, wherein the memory has stored therein user identification information that a second remote device can obtain and display to confirm ownership of the portable device.

16. The portable device in accordance with claim 15, wherein the portable device is configured to be coupled to an external programming machine that is configured to store the user identification information in the memory of the security device.

17. The portable device in accordance with claim 13, wherein a current induced in the antenna by a received signal provides at least some of the power for the portable device.

18. The portable device in accordance with claim 13, wherein the security device is part of a circuit between the power supply of the portable device and other circuitry of the portable device and wherein during a third mode of operation the security device acts as a power switch that disconnects the power supply of the portable device from the other circuitry of the portable device to thereby cause the portable device to become inoperable.

19. A system for providing security for an electronic device in an environment, the system comprising:

an embeddable security device configured to be embedded in a device, the embeddable security device including at least a transmitter, a receiver, and logic configured to transmit and/or receive a first signal and a second signal; wherein the embeddable security device further includes a memory having user identification information thereon;

a portable device that is remote from the embeddable security device configured to be linked to the embeddable security device, the remote portable device including at least a transmitter, a receiver, and logic, wherein the remote portable device transmits the first signal to or receives the first signal from the embeddable security device so as to determine that the embeddable security device is proximate the remote portable device;

an alarm system that is external to both the embeddable security device and the remote portable device, wherein the alarm system is configured to produce an alarm signal upon receiving the second signal when the embeddable security device is proximate the alarm system, the second signal being transmitted when the remote portable device is not proximate the embeddable security device; and a second remote device configured to read the security information in the memory of the embeddable security device to thereby ascertain an owner of an electronic device containing the embeddable security device.

20. The system in accordance with claim 19, wherein the alarm system is configured to read the user identification information and the second remote device is further configured to obtain the user identification information from the alarm system.

21. A system for providing security for an electronic device in an environment, the system comprising:

an embeddable security device configured to:
  in response to a first signal not being received between the embeddable security device and a remote portable device, determine an amount of time that the first signal has not been received; and
  in response to the amount of time reaching a first threshold amount of time, transmit a second signal to an electronic article surveillance (EAS) system, the EAS system being external to both the embeddable security device and the remote portable device, the second signal being configured to cause the external EAS system to emit an alarm signal.

22. The system in accordance with claim 21, wherein the embeddable security device is configured to transmit signals at frequencies that are compatible with electronic article surveillance (EAS) systems, the frequencies including 8.2 MHz, 4.6 MHz, 3.25 MHz, 1.99 and 2.0 MHz, 1.81 MHz, 500 MHz, 58 KHz, and 9.5 MHz.

* * * * *